United States Patent
Hamilton et al.

(10) Patent No.: US 6,277,463 B1
(45) Date of Patent: Aug. 21, 2001

(54) COMPOSITE MEMBER HAVING INCREASED RESISTANCE TO DELAMINATION AND METHOD OF MAKING SAME

(75) Inventors: Brian Koorosh Hamilton; Stephen L. Guymon, both of Mesa, AZ (US)

(73) Assignee: McDonnell Douglas Corporation, St. Louis, MO (US)

(*) Notice: Subject to any disclaimer, the term of this patent is extended or adjusted under 35 U.S.C. 154(b) by 0 days.

(21) Appl. No.: 09/143,638

(22) Filed: Aug. 28, 1998

(51) Int. Cl.$^7$ .................................................... B32B 5/12
(52) U.S. Cl. ................... 428/106; 244/117 R; 244/119; 244/123; 244/131; 244/133; 428/76; 428/109; 428/110; 428/113; 428/122; 428/192; 428/193; 428/911
(58) Field of Search ................... 428/76, 109, 113, 428/106, 377, 36.3, 110, 192, 193, 74, 122, 911, 121, 57; 29/889.6, 889.61, 889.71; 416/229 R; 244/123, 117 R, 119, 131, 133

(56) References Cited

U.S. PATENT DOCUMENTS

| | | | |
|---|---|---|---|
| 3,768,760 | 10/1973 | Jensen | 244/123 |
| 4,120,998 | * 10/1978 | Olez | 428/33 |
| 4,344,995 | * 8/1982 | Hammer | 428/61 |
| 4,350,728 | 9/1982 | Huang et al. | 428/105 |
| 4,359,190 | 11/1982 | Pagano | 239/265.11 |
| 4,696,707 | 9/1987 | Lewis et al. | 156/64 |
| 4,849,913 | 7/1989 | Ward et al. | 364/468 |
| 4,858,146 | 8/1989 | Shebini | 364/512 |
| 5,006,990 | 4/1991 | Ward et al. | 364/768 |
| 5,117,348 | 5/1992 | Romero et al. | 364/167.01 |
| 5,545,455 | * 8/1996 | Prevorsek et al. | 428/76 |
| 5,684,713 | 11/1997 | Asada et al. | 364/512 |

* cited by examiner

Primary Examiner—Nasser Ahmad
(74) Attorney, Agent, or Firm—Alston & Bird LLP

(57) ABSTRACT

A composite member having increased resistance to delamination includes a reinforcing wrap of fiber-matrix composite material which is encircled about the member so that the edge surfaces of the member are covered by the wrap. The wrap includes fibers which are oriented from about −60° to about +60° relative to the direction along which the reinforcing wrap is wrapped about the member. The fibers of the reinforcing wrap impart increased third-axis or Z-direction strength at the edges of the member where interlaminar tensile stresses are greatest.

11 Claims, 3 Drawing Sheets

COMPOSITE MEMBER HAVING INCREASED RESISTANCE TO DELAMINATION AND METHOD OF MAKING SAME

FIELD OF THE INVENTION

The present invention relates to composite structures and, more particularly, to a composite member having increased resistance to delamination caused by interlaminar tensile stresses and to a method of making such a member.

BACKGROUND OF THE INVENTION

Structures formed of composite materials are widely used in load-bearing structural applications. A composite structure is formed typically by laying a number of thin laminates or plies of fiber-matrix material atop one another to build a part of the desired shape and thickness, and then treating the part to cause the matrix material to bond the various plies together to form an integral structure. Each ply may have only unidirectional fibers, or may have multidirectional fibers. The fibers in different plies may have different orientations.

Composite structures have a number of advantages over non-composite structures. For instance, unlike isotropic materials such as metals, composites can be tailored to have different strength in different directions by varying the number of plies and the angular orientations of the different plies, so that the strength properties of the structure are matched to the load distribution which is expected to be experienced by the structure in use.

Composite materials, however, also have a disadvantage compared to isotropic materials, namely, that the matrix material which holds the fibers together is relatively weak in comparison to the fibers, and therefore composite materials tend to be less damage tolerant than isotropic materials such as metals. Once the matrix material is broken at a given location, such as by impact of the structure by an object, the fibers adjacent that location are no longer held in their desired orientations or "fiber paths." Since the ability of the structure to withstand the expected loads depends on the strength of the fibers and on the fibers being oriented generally along the path of the loads, any deviation of the fibers from their desired orientations can result in substantial failure of the structure.

A particularly weak zone of composite laminates is the interface between two adjacent plies or laminates. There typically is a thin layer of matrix material separating the fibers in one laminate from the fibers in the adjacent laminate. Accordingly, this interface layer or "boundary layer" derives its strength solely from the strength of the matrix material, which, as previously noted, is relatively low compared to the strength of the fibers. For this reason, failure by "delamination," where adjacent laminates separate along their interface, is a particularly troublesome failure mode for composite laminate structures.

Techniques for strengthening composite laminates against delamination have been developed. One technique is to include "third axis" fibers which extend between and through the laminates. For example, a method has been proposed wherein short fibers of carbon or wires of titanium are ultrasonically driven through one face of the laminate structure so that they extend in a thickness direction through the structure. Alternatively, stitching has been used as a means for holding the plies or laminates together and reducing the tendency toward delamination. However, these methods have the disadvantage that they tend to increase the stiffness of the structure, which is undesirable where natural resonant frequencies of the structure must be accurately ascertainable and controlled. Additionally, these methods are relatively cumbersome and expensive.

Moreover, it has been hypothesized, and verified by experimentation, that interlaminar tensile stresses between adjacent laminates are greatest at the free edges of a composite structure and rapidly decrease to near zero at the center. The known techniques for reinforcing composites, such as third axis fibers and stitching, have not taken into account this characteristic of the interlaminar tensile stress distribution.

Additionally, the third axis fiber technique and the stitching technique share the disadvantage that damage is done to the fibers of the composite structure when the third axis fibers or stitches are passed through the structure. Moreover, these reinforcing techniques cannot be used for reinforcing a composite structure formed from pre-cured laminates.

SUMMARY OF THE INVENTION

The present invention, in one embodiment, provides a composite member having a reinforcing wrap of fiber-matrix composite material which encircles the member or a portion thereof. The wrap is wrapped in a direction generally from one side edge surface of the member to the opposite side edge surface. The wrap at each side edge surface includes fibers which extend continuously from the upper face to the lower face. The composite laminates and wrap are bonded together by the matrix material to form an integral composite member having increased resistance to delamination by virtue of the composite wrap which provides additional strength in the third axis or Z-direction at the edge surfaces where interlaminar tensile stresses are greatest.

In a preferred embodiment, the composite wrap includes fibers that are oriented from about −60° to about +6020 with respect to the wrap direction. The wrap preferably comprises an elongate tape of predetermined width, and is wrapped in multiple turns about the member. The multiple turns may be layered one atop another so as to form a multi-layered composite wrap encircling at least a portion of the member. Alternatively or additionally, the multiple turns may be staggered relative to one another along a length direction of the member so as to form a generally single-layered composite wrap encircling a lengthwise-extending portion of the member.

In another preferred embodiment of the invention, the composite member includes two portions that have a different number of layers of composite wrap for achieving different degrees of reinforcement of the two portions. For instance, where one portion of the member is determined to have relatively low interlaminar tensile stresses and another portion is determined to have relatively high interlaminar tensile stresses, the one portion may be wrapped with only a single layer of composite wrap, while the other portion may be wrapped with two or more layers of composite wrap.

In accordance with yet another embodiment of the invention, the member further includes fiber-matrix composite edge protectors which are applied to the edges of the member before the composite wrap is wrapped about the member. Each of the edge protectors covers one of the side edge surfaces of the member and extends partially along the upper and lower faces toward the opposite side edge surface of the member. The edge protectors preferably include fibers oriented from about −60° to about +60° relative to the wrap direction. The edge protectors may comprise a single ply of composite material or multiple plies.

The invention also provides methods for making a composite member. In accordance with one embodiment of the invention, a method includes a step of juxtaposing a plurality of fiber-matrix composite laminates each having opposite peripheral edges in facewise disposition with one another and with the peripheral edges in general alignment so as to form a composite member having upper and lower faces and a pair of opposite side edge surfaces which extend between the upper and lower faces. Next, a fiber-matrix composite reinforcing wrap is wrapped in one or more layers about at least a portion of the member such that the fiber-matrix composite reinforcing wrap is wrapped in a wrap direction which extends generally from one side edge surface to the other. The member is then treated to cause matrix bonding of the reinforcing wrap to the laminates so as to form an integral composite member. Where the laminates are not pre-cured, the treatment step also results in matrix bonding of the laminates to one another.

In accordance with a preferred embodiment, the method includes the further step of determining an interlaminar tensile stress distribution occurring at an interface between a selected pair of adjacent laminates in response to a defined load distribution applied to the member, and identifying regions of the member having relatively higher interlaminar tensile stresses. Then, the reinforcing wrap is encircled about those regions of relatively higher stresses. A relatively greater thickness (e.g., more layers) of reinforcing wrap may be applied to those regions having relatively higher stresses, and a relatively smaller thickness (e.g., fewer layers) of wrap may be applied to those regions having relatively lower stresses.

The invention thus provides a relatively simple and inexpensive method of making a composite member having increased resistance to delamination. The reinforcing wrap also improves the damage tolerance of the composite member, and protects the member from tool drops, scratches, and the like. A further advantage of the method and composite member of the invention is that the reinforcing wrap has relatively little impact on the bending and torsional stiffness of the member. In addition, the application of the reinforcing wrap of the present invention to a composite member can be tailored such that the thickness of the reinforcing wrap applied to various regions of the composite member varies in proportion to the level of stress to which the various regions will likely be subjected in use.

BRIEF DESCRIPTION OF THE DRAWINGS

The above and other objects, features, and advantages of the invention will become more apparent from the following description of certain preferred embodiments thereof, when taken in conjunction with the accompanying drawings, in which.

DETAILED DESCRIPTION OF THE DRAWINGS

The invention is now explained by reference to a number of preferred embodiments thereof. It will be understood, however, that the invention is not limited to these embodiments.

Figure 1:
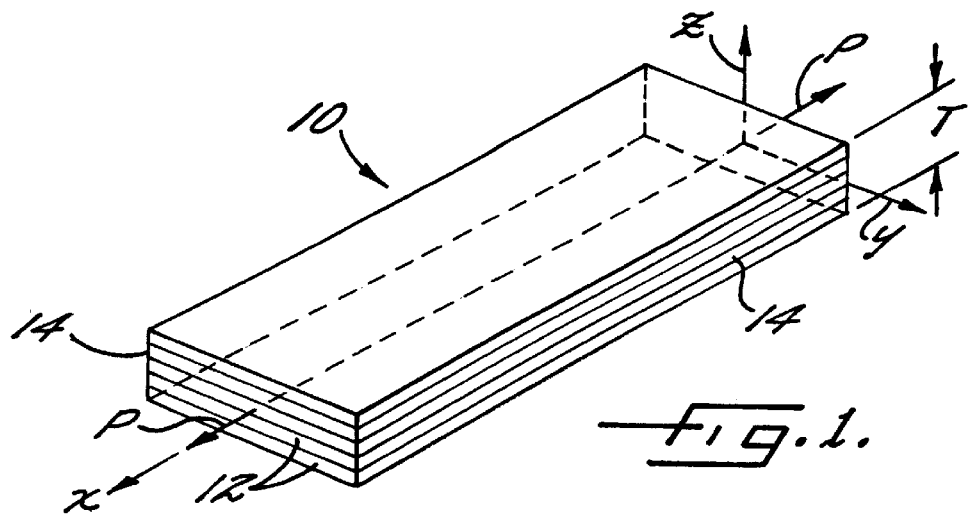
FIG. 1 is a perspective view of a conventional composite structural member.

With reference to FIG. 1, a conventional composite member is broadly indicated by the reference numeral 10. The member 10 is shown for illustrative purposes as being constructed of 5 individual laminates 12 laid one atop another in facewise contact, although it will be appreciated that the number of laminates used will depend upon the particular application. Each laminate 12 comprises a plurality of relatively high-strength fibers of glass, carbon, aramid, or other suitable material, embedded within a matrix material such as a resin, in conventional fashion. Typically, each laminate 12 is unidirectional (i.e., the laminate has all of the fibers oriented along a single direction), although multi-directional laminates may be used. The fiber orientations in the various laminates 12 may be different.

Figure 2:
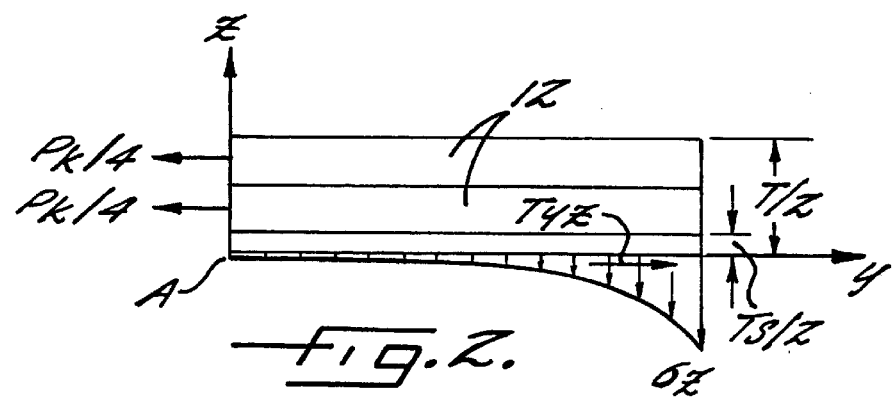
FIG. 2 is a free body diagram of a portion of the 5-ply composite member of FIG. 1 taken on the yz-plane, showing the transverse kick loads acting on the upper two laminates and the distributed tensile and shear stresses acting on the middle laminate.

When the composite member 10 is placed under a load, such as the tensile load P acting along the direction of the x-axis as shown in FIG. 1, each of the two laminates 12 above and below the middle laminate experiences a transverse kick load per unit length $P_k/4$ acting in the direction of the y-axis. FIG. 2 depicts a free body diagram of a unit length of the member 10, showing the kick loads acting on the laminates 12 on one side of the longitudinal center line, and showing distributed shear stress $\tau_{yz}$ and tensile stress $\sigma_z$ acting on the midplane of the middle laminate.

It has previously been theorized that the interlaminar tensile stress $\sigma_z$ in a composite laminate goes to zero in the region where classical lamination theory applies (e.g., in the region of the longitudinal center line of the member 10), and may go to infinity at the free edges. However, no simple closed-form solution for the interlaminar tensile stress $\sigma_z$ and shear stress $\tau_{yz}$ has been given in the composite literature. Applicants have developed a simple closed-form solution for these stresses by hypothesizing that the thin layer of matrix material that exists at the interface between two adjacent laminates in a composite structure behaves as an isotropic material. Accordingly, the approach proposed by Timoshenko for istropic materials is followed for determining the stress distributions occurring on the interface. Specifically, the stress distributions are derived by solving the biharmonic equation:

$$\frac{\partial^4 \phi}{\partial x^4} + 2\frac{\partial^4 \phi}{\partial x^2 \partial y^2} + \frac{\partial^4 \phi}{\partial y^4} = 0$$

The stress function φ which is selected to satisfy the biharmonic equation is:

$$\phi = \sin(\alpha x) f(y)$$

where α represents the characteristic roots of the equation. Upon substituting φ into the biharmonic equation, the following equation is obtained:

$$\alpha^4 f(y) - 2\alpha^2 f''(y) + f^{IV}(y) = 0$$

This equation is then solved, subject to specific boundary conditions associated with the particular structure and load distribution under consideration. For a thin flexible composite structure, the mode shapes given by Timoshenko and Goodier in their text Theory of Elasticity (McGraw-Hill, 1970), are used:

$$\sigma_z = \sigma_o \frac{(\alpha c \sinh(\alpha c) - \cosh(\alpha c)) \sinh(\alpha y) - \alpha y \cosh(\alpha y) \cosh(\alpha c)}{\sinh(2\alpha c) - 2\alpha c}$$

$$\tau_{yz} = \tau_o \frac{\alpha c \sinh(\alpha c) \cosh(\alpha y) - \alpha y \sinh(\alpha y) \cosh(\alpha c)}{\sinh(2\alpha c) - 2\alpha c}$$

where
- c=a known parameter based on the geometry of the structure (for example, c is equal to one-half of the chord width in the y-axis direction for the member shown in FIG. 1);
- $\sigma_0$=a proportionality constant resulting from solution of the partial differential equation; and
- $\tau_0$=a proportionality constant resulting from solution of the partial differential equation.

Next, a moment balance about the point A is taken for the free body diagram of FIG. 2:

$$\sum M_A = 0$$

$$\frac{P_k}{4} \frac{T_s}{2} + \frac{P_k}{4} \frac{(T-T_s)}{2} = \int_A y \sigma_z dA$$

and a force balance is taken for the element:

$$\sum F = 0$$

$$\frac{P_k}{4} + \frac{P_k}{4} = \int_A \tau_{yz} dA$$

The interlaminar tensile stress $\sigma_z$ and shear stress $\tau_{yz}$ from the above equations are substituted into the moment and force balance equations, and the resulting equations are solved for $\sigma_0$ and $\tau_0$.

Figure 3:
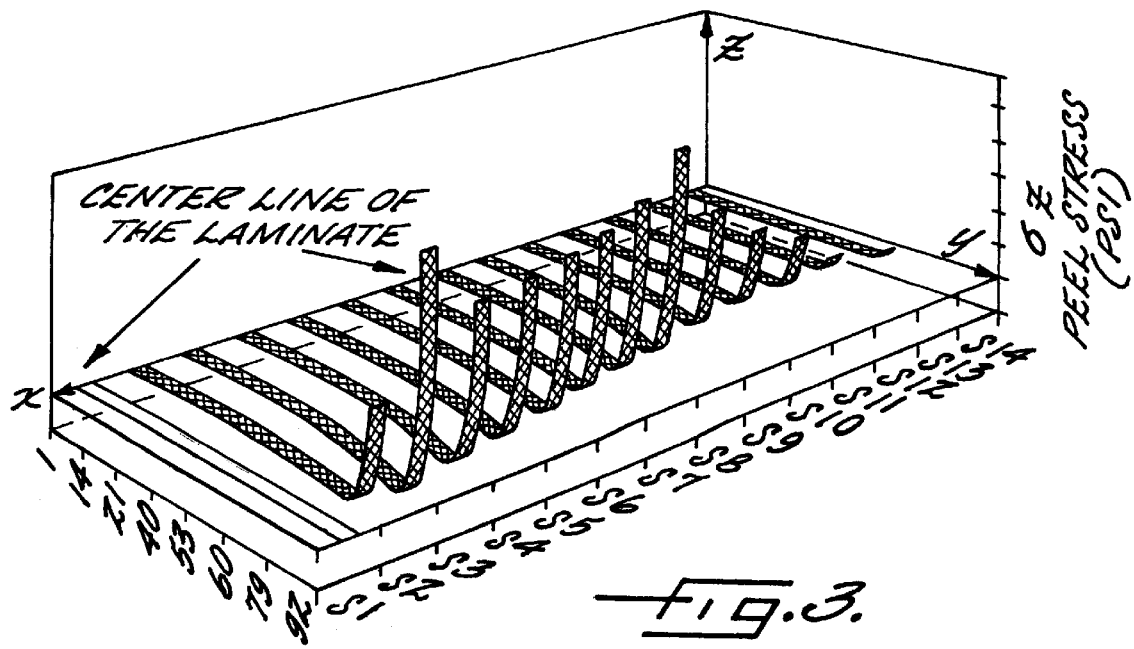
FIG. 3 is a graph depicting the interlaminar tensile stress $\sigma_z$ acting on the middle laminate of the member of FIG. 1.

FIG. 3 shows the interlaminar tensile stress distribution $\sigma_z$ calculated by solving the above equations, for a selected set of boundary conditions. It can be seen that the tensile stress $\sigma_z$ becomes large at the free edge, but remains finite as long as the laminate thickness is finite. It can be shown that the thinner the laminate is, the higher is the tensile stress at the edge of the laminate.

In accordance with one embodiment of the invention, the distribution of interlaminar tensile stress $\sigma_z$ is used to identify those regions of the composite member requiring reinforcing against delamination at the edges of the member. While the distribution of interlaminar tensile stress $\sigma_z$ can be determined using the foregoing closed-form solution method, it will be understood that other methods for determining the stress distribution can be used, if desired, including finite-element modeling techniques or the like. It will be appreciated that the probability of a delamination failure occurring is directly related to the magnitude of the stress $\sigma_z$, since this stress acts in a direction tending to cause one laminate to be peeled away from an adjacent laminate. In the z-axis direction, the strength of the bond between two adjacent laminates is derived solely from the relatively weak matrix material. The invention addresses this deficiency by providing a relatively simple method for reinforcing a composite member against delamination.

Figure 4:
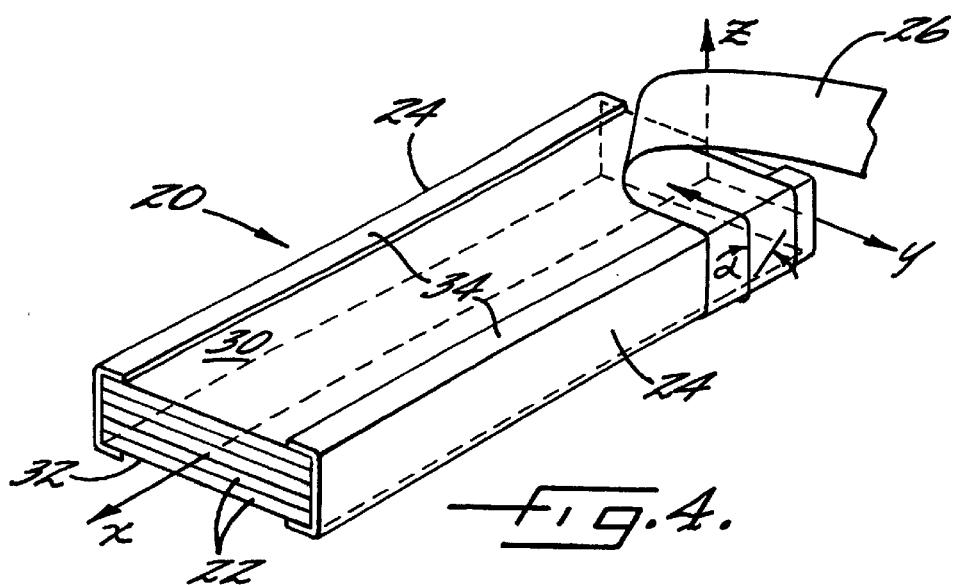
FIG. 4 is a perspective view of a composite member in accordance with one embodiment of the invention, showing edge protectors applied to the member and a reinforcing composite wrap being wrapped about the member.

FIG. 4 depicts an illustrative composite member 20 in accordance with one embodiment of the invention. The member 20 comprises 5 plies or laminates 22 laid atop one another to define a member having opposite side edge surfaces 24 requiring reinforcement against delamination. The edge surfaces 24 represent the edges of the member which, under the particular loads experienced by the member in use, have calculated interlaminar tensile stresses $\sigma_z$ indicating a need for reinforcement against delamination. For example, in the simple case of an elongate bar placed under pure tensile loading P as shown in FIG. 1, the edges 14 extending along the direction of the tensile load would be the edges at which maximum tensile stress $\sigma_z$ would occur, and thus would be the edges requiring reinforcement. However, it will be understood that the invention is not limited to such simple structures and loading situations, and complex structural members placed under combined bending, torsional, and tensile/compressive loads are equally suitable candidates for treatment in accordance with the invention.

With reference to FIG. 4, the invention in one embodiment provides a method of reinforcing a composite member which includes wrapping a composite reinforcing wrap 26 about the member in a wrap direction which extends generally from one to the other of the side edge surfaces 24, so that the wrap 26 encircles at least a portion of the member. The wrap 26 comprises a fiber/matrix material having fibers oriented at an angle $\alpha$ relative to the wrap direction. Preferably, $\alpha$ is from about −60° to about +60°, and more preferably is about 0° so that the wrap 26 does not substantially increase the bending and torsional stiffness of the member 20. Preferably, when the wrap 26 is applied to the member 20 there are fibers which continuously extend from the upper face 30 and over each edge surface 24 to the lower face 32 (FIG. 6) such that the fibers provide strength to the member in the z-axis direction at the edge surfaces 24. The composite wrap 26 tends to hold the fibers of the laminates 22 in their desired orientations so that the member 20 retains its integrity and strength at the edges. Advantageously, a film adhesive is applied between the member 20 and the wrap 26. Once the wrap 26 is applied to the member 20, the member 20 is treated to cause matrix bonding of the various laminates 22 to each other and to cause the wrap 26 to bond with the member 20 so as to form an integral composite structure.

Figure 5:
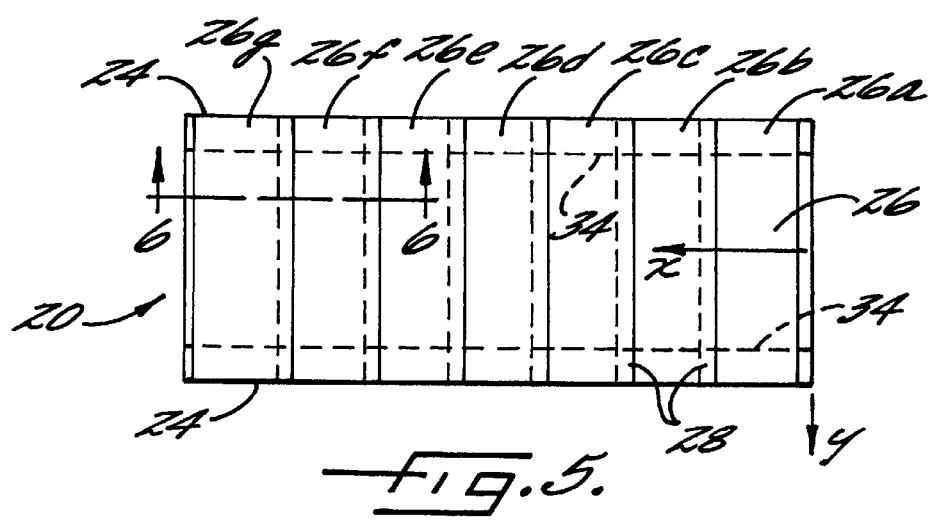
FIG. 5 is a top elevational view of the composite member of FIG. 4 after the reinforcing wrap has been applied over substantially the entire length of the member.

The wrap 26 may extend along a lengthwise-extending portion of the member 20 by wrapping the wrap 26 in a plurality of turns about the member which each successive turn staggered in the lengthwise direction from the preceding turn, as shown in top elevation in FIG. 5. The wrap 26 may be wrapped for a plurality of turns in one continuous length, or alternatively may be wrapped in a series of shorter lengths, e.g., each turn comprising a discrete length of wrap. If desired, each successive turn may partially or completely overlap the preceding turn. Thus, as shown in FIG. 5, the wrap 26 is wrapped in successive turns 26a–g about the member 20 with overlap regions 28 between the turns.

Figure 6:
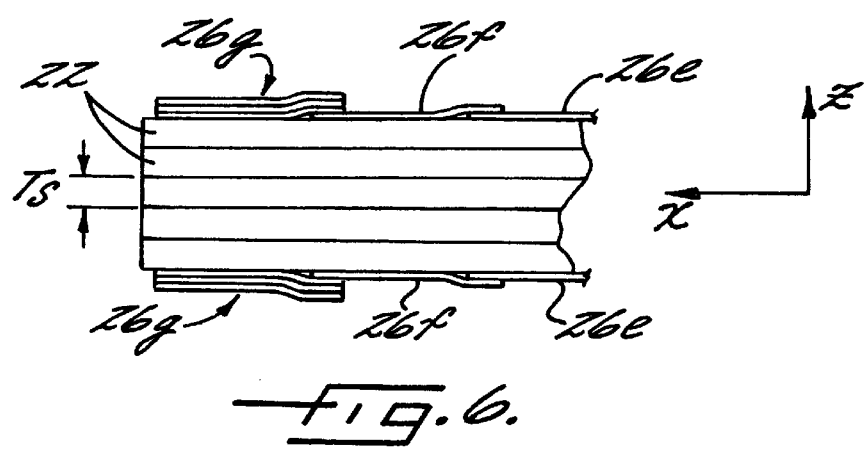
FIG. 6 is a cross-sectional view taken on line 6—6 of FIG. 5.

In general, the tensile stress distribution $\sigma_z$ occurring at the edges 24 will have a nonuniform shape, and thus there will be regions of relatively lower stress and regions of relatively higher stress. The reinforcing wrap 26 can be applied so as to provide a differing degree of z-axis strength in different regions of the member depending on the level of interlaminar tensile stress $\sigma_z$ occurring in those regions. Thus, as illustrated in FIGS. 5 and 6, a single layer of wrap 26 is applied in each of turns 26a–f, and three layers of wrap 26 are applied at 26g so that a greater thickness of the reinforcing wrap is achieved in that region of the member. It will be understood that this is only one illustrative example of a wrapping pattern, and the wrap may be applied in any desired pattern to achieve any desired distribution of wrap thickness depending on the needs of a particular application.

The composite member 20 also includes composite edge protectors 34 which are applied to the edges of the member before the wrap 26 is wrapped about the member. Each edge protector 34 covers one of the side edge surfaces 24 and extends partially along the upper and lower faces 30 and 32, respectively, toward the other edge of the member. The edge protectors 34 provide additional z-axis reinforcement at the edge surfaces 24 and also provide added ruggedness to the member by protecting the edges against impact damage which may precipitate a delamination failure. However, the edge protectors 34 are not essential, and the member can be wrapped by the composite wrap 26 without first applying the edge protectors 34 if additional edge protection is not desired. Alternatively, a composite structure in accordance with the invention may include edge protectors 34 without any reinforcing wrap 26.

Figure 7:
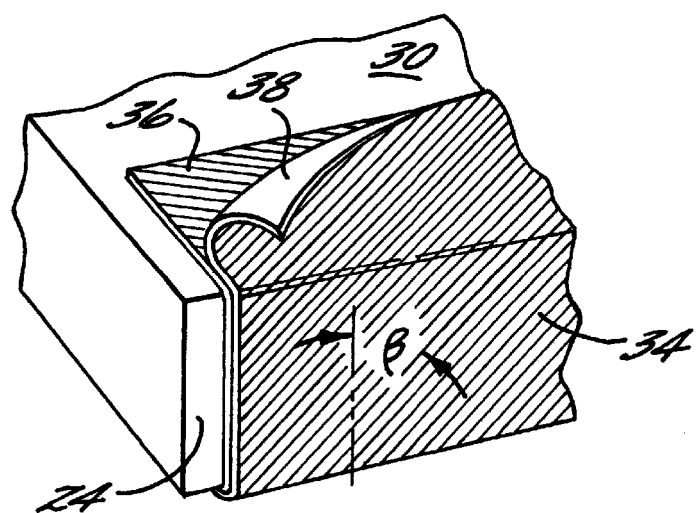
FIG. 7 is a fragmentary perspective view of a composite member having a two-ply edge protector comprising a ply with +45° fibers and a ply with −45° fibers.

Each of the edge protectors includes fibers which continuously extend from the upper face 30 over the side edge surface 24 and to the lower face 32, as illustrated in FIG. 7. In a preferred embodiment of the invention, each edge protector 34 comprises fibers oriented at an angle β relative to the thickness direction, the thickness direction being defined as the path of shortest distance from the lower face 32 to the upper face 30 at the edge surface 24. Preferably, β is from about −60° to about +60°. More preferably, the edge protectors 34 comprise at least one ply 36 having −45° fibers and at least one ply 38 having +45° fibers relative to the thickness direction, as shown in FIG. 7.

Figure 8:
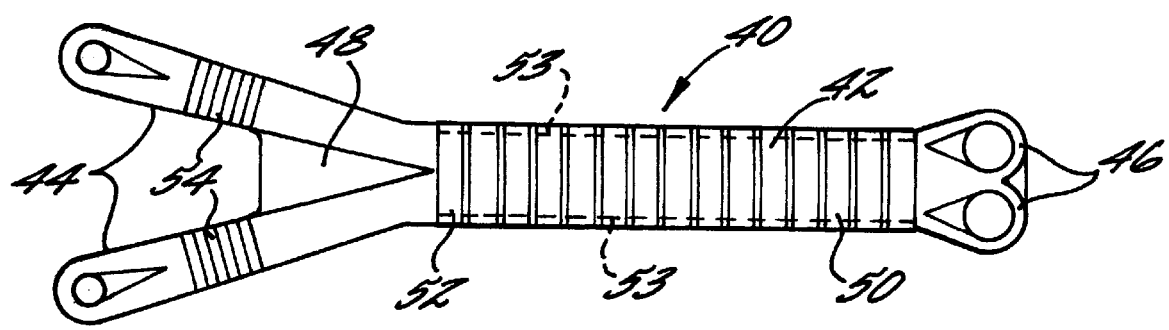
FIG. 8 is a top elevational view of a flexbeam for a helicopter rotor, showing reinforcing composite wrap applied to portions of the flexbeam having high interlaminar tensile stresses.

As a further illustrative example, FIG. 8 depicts a composite flexbeam for a helicopter rotor to which the reinforcing method of the invention has been applied. It should be apparent, however, that the reinforcing method of the present invention can be applied in a myriad of applications, if so desired. With respect to FIG. 8, the flexbeam 40 comprises a multiple-ply composite member having a middle beam portion 42, a first pair of arms 44 integrally joined to one end of the beam portion 42, and a second pair of arms 46 integrally joined to the other end of the beam portion 42. A web 48 interconnects the inward portions of the arms 44. Calculations of interlaminar tensile stress $\sigma_z$ for the flexbeam 42 revealed that the regions of relatively high stress occur in the middle beam portion 42 and in the arms 44 adjacent the web 48, and the region of highest stress occurs in the beam portion 42 adjacent the arms 44. Accordingly, substantially the entire length of the beam portion 42 was wrapped with a one-inch wide glass fiber/matrix cloth 50 (181 E-Glass cloth available from Corning) with 0.1–0.2 inch overlap between successive turns. The region of the beam portion 42 adjacent the arms 44 was additionally wrapped with five turns of 2-inch wide 181 E-Glass cloth 52. Edge protectors 53 of 181 E-Glass cloth were applied to the side edges of the beam portion 42 before wrapping the beam portion with the cloth wraps 50, 52. The arms 44 adjacent the web 48 were also wrapped with four turns of one-inch wide 181 E-Glass cloth 54 with about 0.5-inch overlap between successive turns. Film adhesive was applied between the flexbeam 40 and the wraps 50, 52, and 54. The resulting flexbeam 40 was determined to have a substantially greater fatigue life than composite flexbeams which do not include composite reinforcing wraps in accordance with the invention.

Based on the foregoing description of certain preferred embodiments of the invention, it will be apparent that the invention provides a relatively simple and inexpensive method of making a composite member having increased resistance to delamination. The reinforcing wrap also improves the damage tolerance of the composite member, and protects the member from tool drops, scratches, and the like. A further advantage of the method and composite member of the invention is that the reinforcing wrap has relatively little impact on the bending and torsional stiffness of the member. In addition, the application of the reinforcing wrap of the present invention to a composite member can be tailored such that the thickness of the reinforcing wrap applied to various regions of the composite member varies in proportion to the level of stress to which the various regions will likely be subjected in use.

While the invention has been described by reference to certain preferred embodiments thereof, it is to be understood that the invention is not limited to these illustrative embodiments. Various modifications and/or substitutions of equivalents can be made to the described embodiments without departing from the scope of the invention as set forth in the appended claims. For example, while the illustrated embodiments have the edge protectors and the reinforcing wrap used together, in some applications it may be desirable to use edge protectors without a wrap or to use a wrap without edge protectors. Other modifications can also be made within the scope of the invention.

What is claimed is:

1. A composite article having increased resistance to delamination, comprising:

a plurality of fiber-matrix composite laminates each having opposite peripheral edges, the laminates being juxtaposed in facewise disposition with one another with the peripheral edges generally aligned so as to form a composite member having upper and lower faces and a pair of opposite side edge surfaces extending therebetween; and a fiber-matrix composite wrap encircled about at least a portion of the composite member in a wrap direction generally from one side edge surface to the other and covering the side edge surfaces, the wrap at each side edge surface including fibers which extend continuously from the upper face to the lower face, the wrap having a varying thickness along a longitudinal direction of the composite member such that the wrap is relatively thicker in regions of relatively higher predetermined interlaminar tensile stresses occurring at the peripheral edges of the laminates, and is relatively thinner in regions of relatively lower predetermined interlaminar tensile stresses occurring at the peripheral edges of the laminates;

the composite laminates and composite wrap being bonded together by matrix material to form an integral composite article having increased resistance to delamination.

2. The composite article of claim 1, wherein the composite wrap includes fibers oriented from about −60° to about +60° relative to the wrap direction.

3. The composite article of claim 1, wherein the composite wrap comprises an elongate tape of predetermined width which is wrapped in multiple turns about the member.

4. The composite article of claim 3, wherein the multiple turns of the composite wrap are layered one atop another so as to form a multi-layered composite wrap encircling at least a portion of the member.

5. The composite article of claim 4, wherein the relatively thicker regions of the wrap have a greater number of layers of the tape than the relatively thinner regions of the wrap.

6. The composite article of claim 3, wherein the multiple turns of the composite wrap are staggered relative to one another in the longitudinal direction of the member.

7. The composite article of claim 6, further comprising fiber-matrix composite edge protectors disposed between the composite member and the reinforcing wrap, each of the edge protectors covering one of the side edge surfaces of the member and extending partially along the upper and lower faces toward the other side edge surface.

8. The composite article of claim 7, wherein the edge protectors include fibers oriented from about +60° to −60° relative to the wrap direction.

9. A composite article having increased resistance to delamination, comprising:

a plurality of fiber-matrix composite laminates each having opposite peripheral edges, the laminates being juxtaposed in facewise disposition with one another with the peripheral edges generally aligned so as to form a composite member having upper and lower faces and a pair of opposite side edge surfaces extending therebetween; and fiber-matrix composite edge protectors each covering one of the side edge surfaces of the member and extending only partially along the upper and lower faces toward the other side edge surface, each edge protector including fibers which extend continuously from the upper face to the lower face.

10. The composite article of claim 9, wherein each edge protector includes fibers oriented at an angle between about −60° and +60° with respect to a thickness direction which extends along a path of shortest distance through the member from the upper face to the lower face adjacent the side edge surface.

11. The composite article of claim 10, wherein each edge protector includes fibers oriented about −45° relative to the thickness direction and fibers oriented about +45° relative to the thickness direction.

* * * * *